(12) United States Patent
Keller et al.

(10) Patent No.: US 11,993,257 B2
(45) Date of Patent: May 28, 2024

(54) METHOD FOR OPERATING A VEHICLE ASSISTANCE SYSTEM, DEVICE FOR EXECUTING THE METHOD, AND VEHICLE

(71) Applicants: Daimler AG, Stuttgart (DE); Robert Bosch GmbH, Stuttgart (DE)

(72) Inventors: Christoph Gustav Keller, Stuttgart (DE); Holger Mielenz, Ostfildern (DE)

(73) Assignees: Daimler AG, Stuttgart (DE); Robert Bosch GmbH, Stuttgart (DE)

( * ) Notice: Subject to any disclaimer, the term of this patent is extended or adjusted under 35 U.S.C. 154(b) by 476 days.

(21) Appl. No.: 17/290,324

(22) PCT Filed: Oct. 15, 2019

(86) PCT No.: PCT/EP2019/077847
§ 371 (c)(1),
(2) Date: Apr. 30, 2021

(87) PCT Pub. No.: WO2020/088926
PCT Pub. Date: May 7, 2020

(65) Prior Publication Data
US 2021/0370930 A1    Dec. 2, 2021

(30) Foreign Application Priority Data
Oct. 30, 2018    (DE) .................... 10 2018 127 061.5

(51) Int. Cl.
*B60W 30/09*    (2012.01)
*B60W 10/18*    (2012.01)
(Continued)

(52) U.S. Cl.
CPC ............ *B60W 30/09* (2013.01); *B60W 10/18* (2013.01); *B60W 30/0956* (2013.01);
(Continued)

(58) Field of Classification Search
CPC .. B60W 30/09; B60W 30/0956; B60W 30/08; B60W 10/18; B60W 10/20;
(Continued)

(56) References Cited

U.S. PATENT DOCUMENTS

| 1,903,054 A * | 3/1933 | Laurent .................. H02G 15/12 |
| | | 178/46 |
| 9,315,107 B2 * | 4/2016 | Tojima ..................... B60L 50/11 |

(Continued)

FOREIGN PATENT DOCUMENTS

| DE | 10317044 A1 | 10/2004 |
| DE | 102011113077 A1 | 3/2013 |

(Continued)

OTHER PUBLICATIONS

European Patent Office, International Search Report in application No. PCT/EP2019/077847, dated Jan. 8, 2020, 6 pages, Rijswijk Netherlands.

(Continued)

*Primary Examiner* — Russell Frejd
(74) *Attorney, Agent, or Firm* — Marshall & Melhorn, LLC

(57) ABSTRACT

A method for operating a vehicle assistance system is described. In one embodiment, when the vehicle is in the autonomous driving mode, encountering an obstacle is prevented independent of the passage height, due to a control unit if is determined that the obstacle is a load supported by a working machine, where the load projects into a driving corridor of the vehicle or moves in the driving corridor. Also described is a device for carrying out the method and to a vehicle having such a device.

11 Claims, 1 Drawing Sheet

(51) Int. Cl.
*B60W 30/095* (2012.01)
*B60W 60/00* (2020.01)
*G06V 20/58* (2022.01)

(52) U.S. Cl.
CPC .... *B60W 60/0011* (2020.02); *B60W 60/0015* (2020.02); *B60W 2554/4023* (2020.02); *B60W 2554/4041* (2020.02); *B60W 2554/4044* (2020.02); *G06V 20/58* (2022.01)

(58) Field of Classification Search
CPC ......... B60W 60/0011; B60W 60/0015; B60W 60/001; B60W 2554/4023; B60W 2554/4041; B60W 2554/4044; B60W 2554/402; G06V 20/58; G08G 1/166; G08G 1/161; G08G 1/164
See application file for complete search history.

(56) References Cited

U.S. PATENT DOCUMENTS

| | | | | |
|---|---|---|---|---|
| 9,477,894 | B1* | 10/2016 | Reed | G06V 20/586 |
| 2009/0315693 | A1* | 12/2009 | Nugent | G01S 15/931 |
| | | | | 340/815.45 |
| 2012/0081218 | A1* | 4/2012 | Nugent | B60Q 9/008 |
| | | | | 340/431 |
| 2012/0139756 | A1* | 6/2012 | Djurkovic | G08G 1/095 |
| | | | | 340/905 |
| 2014/0067187 | A1 | 3/2014 | Ferguson et al. | |
| 2016/0297360 | A1* | 10/2016 | Smyth | B60Q 9/00 |
| 2016/0378111 | A1* | 12/2016 | Lenser | G05D 1/0088 |
| | | | | 701/2 |
| 2018/0257661 | A1 | 9/2018 | Kroop et al. | |
| 2021/0025143 | A1* | 1/2021 | Cohen | G05D 1/0274 |

FOREIGN PATENT DOCUMENTS

| | | |
|---|---|---|
| DE | 102013209873 A1 | 12/2014 |
| DE | 102014210259 A1 | 12/2015 |
| DE | 102016224076 A1 | 6/2018 |
| WO | 9745358 A1 | 12/1997 |

OTHER PUBLICATIONS

German Patent Office, German Office Action in application No. DE102018127061.5, dated Jul. 5, 2019, 6 pages, Munich Germany.
China Intellectual Property Administration, Office Action in Application No. CN20198006966.2, dated Apr. 28, 2023, 10 pages.
National Standard of People's Republic of China, GB6067.1-2019, Standardization Administration of the P.R.C., Sep. 26, 2010.

* cited by examiner

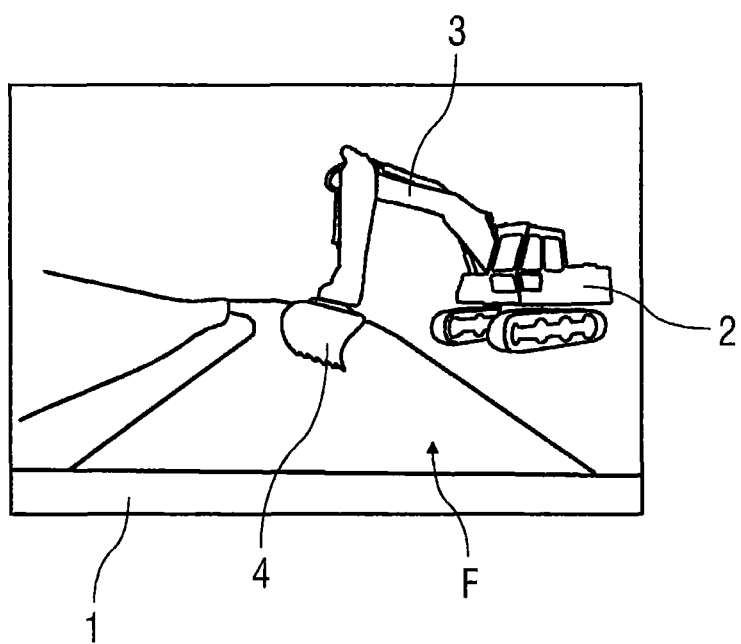

METHOD FOR OPERATING A VEHICLE ASSISTANCE SYSTEM, DEVICE FOR EXECUTING THE METHOD, AND VEHICLE

FIELD

The invention concerns a method for operating a vehicle assistance system. The invention also concerns a device for executing the method and a vehicle with such a device.

BACKGROUND

DE 10 2013 209 873 A1 discloses a device and a method for determining a vehicle's ability to pass under an obstacle. It provides for a first sensor unit to measure a passage height under the obstacle and an interpretation unit. The interpretation unit compares the measured passage height to an actual vehicle height in such a way that a warning is issued in the event that the measured passage height does not permit the vehicle to pass under the obstacle. The actual vehicle height is determined by a second sensor unit mounted on the roof of the vehicle.

In addition, EP 2 753 479 discloses a vehicle and a device for determining whether a vehicle can pass under an object using a 3D camera. The 3D camera takes at least one picture of the surroundings in front of the vehicle. At least one probable trajectory for the vehicle's movement is also calculated. It is then determined, based on the 3D camera's image data, whether an object is located in the trajectory and whether it has one or more connections to the ground. From this it is determined whether it is possible to pass under the object, wherein the dimensions and shape of the entry space between object and road are calculated based on the image data.

SUMMARY

The invention is based on the object to provide an improved method, compared to the prior art, for operating a vehicle assistance system, an improved device, and a vehicle having such a device.

This object is achieved according to the invention by the method whose features are described in the claims and by the device whose features are described in the claims.

Advantageous embodiments of the invention are the object of the subordinate claims.

According to the invention, a method for operating a vehicle assistance system provides that, in the vehicle's autonomous driving mode, passage under an obstacle having a passage height that has been determined to be sufficiently high is prevented by a control unit, if it is determined that the obstacle is a load being carried by a heavy machine that protrudes into the vehicle's driving route or is moving into the driving route. Autonomous driving mode is understood here to mean an automated driving mode, in particular a partially automated driving mode, highly automated driving mode, or fully automated driving mode. Advantageously, the method is used with a highly automated driving mode or fully automated driving mode.

An acceptable or acceptably high passage height is understood to mean in particular a passage height corresponding to the height of the vehicle with an additional safety margin of one meter, for example. In other words, the calculated passage height is high enough if it is equal to or greater than the sum of the vehicle's height and the one-meter safety margin, for example:

acceptable passage height=vehicle height+safety margin.

Advantageously, with this method for operating the vehicle assistance system in the vehicle's autonomous driving mode, passage under the obstacle is prevented by the control unit regardless of the calculated passage height, and indeed at any calculated passage height, even a passage height determined to be acceptable, if it is determined that the obstacle is a load being carried by a heavy machine that protrudes into the vehicle's driving route or is moving into the driving route.

Advantageously, in the vehicle's autonomous driving mode, passage under an obstacle with a passage height determined not to be high enough is always prevented by the control unit. If the passage height is determined to be high enough, in the vehicle's autonomous driving mode, passage under the obstacle is generally not prevented by the control unit, because the acceptably high passage height permits safe passage under the obstacle; however, in the vehicle's autonomous driving mode, passage under the obstacle is always prevented by the control unit, if it is determined that the obstacle is a load being carried by a heavy machine that protrudes into the vehicle's driving route or is moving into the driving route, even if the determined passage height is high enough. I.e., in the vehicle's autonomous driving mode, advantageously, passage under the obstacle when the calculated passage height is high enough is prevented by the control unit, only if the obstacle is a load being carried by a heavy machine that protrudes into the vehicle's driving route or is moving into the driving route. Otherwise, i.e., if the obstacle is not a load being carried by a heavy machine that protrudes into the vehicle's driving route or is moving into the driving route, passage under the obstacle with passage height that has been determined to be sufficiently high is not prevented.

Use of the method makes it possible to exclude, as much as possible, this type of potentially hazardous traffic situation, i.e., in particular passage under an obstacle that is a load being carried by a heavy machine that protrudes into the vehicle's driving route or is moving into the driving route, so that occupants of the vehicle, which can be a shuttle or so-called robotaxi, are protected from a falling load or parts of the load.

The heavy machine may be, in particular, a crane or an excavator, wherein the load being carried can be a crane load, an excavator shovel, and/or a component or comparable item transported by the excavator shovel or with cables, chains, or similar structures.

Based on a situation analysis conducted as part of the method with respect to the potentially hazardous traffic situation, a human assessment model is created.

Using the method, the autonomously operated vehicle's acceptance can be significantly increased.

Passage under the load is prevented in one embodiment of the method by braking the vehicle to a standstill, with the vehicle's driving mode resumed once the load is no longer in the driving route. This may significantly reduce any danger to the occupants if the load should fall, allowing for comparatively safer autonomous operation of the vehicle.

Alternatively or additionally, passage under the load is prevented by re-planning a trajectory for the vehicle, so that an operating area of the heavy machine is circumvented. This eliminates any danger to the vehicle from a falling load, if there is adequate space to drive around it.

Alternatively or additionally, a hazard potential resulting from the load is predicted, and passage under the obstacle is prevented only if the predicted hazard potential is high, i.e., if passage under the obstacle is hazardous to the vehicle or its occupants. This can be the case, for example, if the load consists of separate items, such as a roof pallet with roof tiles that could come loose from the load. This hazard is also especially high if the load is making swinging motions, which may be promoted by environmental influences such as wind.

Also alternatively or additionally, prevention of the passage under the load takes place by braking the vehicle to a standstill, and a decision regarding how to proceed with respect to further operation of the vehicle is requested from a remote operator.

In an additional embodiment of the method, the heavy machine is detected based on its contour, and a comparison is made in particular using image patterns stored in the control unit. By recording the heavy machine based on its contour, the risk of an erroneous determination can be minimized as much as possible.

In particular, the contour of the heavy machine is determined based on captured signals from a sensor system for the surroundings of the vehicle, wherein image signals from a camera on the vehicle are used in order to be as sure as possible that the recorded object is a heavy machine. In addition, information from another contour-determining sensor, such as Lidar, can be used to improve object classifications based on contour information.

In a possible further embodiment of the method, a movement path for the load being carried by the heavy machine is determined using a movement model. Using the movement model, the movement path or "flight path" of the load can be calculated with more certainty, so that a hazard potential for the vehicle and its occupants can be deduced.

If a distance from the vehicle to the load falls below a given distance, one possible embodiment of the method provides for the safety of the vehicle, and in particular its occupants, by automatically engaging emergency braking. By means of emergency braking, the vehicle is brought to a standstill before it reaches the heavy machine, i.e., before the load being carried by it.

In addition, the invention concerns a device for executing the method, wherein a control unit in the assistance system in the vehicle's autonomous driving mode prevents passage under the obstacle having a passage height that has been determined to be sufficiently high, if it is determined that the obstacle is a load being carried by a heavy machine that protrudes into the vehicle's driving route or is moving into the driving route. With the device for executing the method, the control unit in the vehicle assistance system in the vehicle's autonomous driving mode prevents passage under the obstacle, advantageously regardless of the calculated passage height, i.e., at any calculated passage height and even at a passage height determined to be acceptable, if it is determined that the obstacle is a load being carried by a heavy machine that protrudes into the vehicle's driving route or is moving into the driving route.

The invention also concerns a vehicle with such a device.

DESCRIPTION OF THE FIGURES

Examples of the invention are explained in more detail below, with reference to a FIGURE.

Shown in:

FIG. 1 schematically is a section of road in front of a vehicle with a heavy machine and a load moving into the driving route of the vehicle.

DESCRIPTION

In the single FIGURE, a vehicle 1 is schematically indicated. The reference number 1 symbolizes a hood of the vehicle 1, as it is seen by a vehicle occupant or by a camera. The vehicle 1 is located on a road section F, and in the forward driving direction of the vehicle 1 there is a heavy machine 2 in the form of an excavator, with a load 4, for example an excavator shovel and/or a construction component, attached to its arm 3 such that it hangs down. The arm 3 with the load 4 is moving into the driving route of the vehicle 1.

The vehicle 1 is operating in autonomous driving mode, and the vehicle 1 can be a driverless shuttle or a so-called robotaxi.

In order to exclude passage of the vehicle 1 under a potentially hazardous obstacle, such as the arm 3 with the load 4 according to the preceding example, as much as possible, a method as described below is provided.

By means of the method, first a traffic situation encountered by the vehicle 1 on the road section F concerning passage and a hazardous load 4 is recognized, and then, if the existence of such a traffic situation with a hazardous load 4 is recognized, control of the vehicle is adapted to the traffic situation in such a way that the hazard posed by the load 4 is at least significantly reduced.

The vehicle 1 has a sensor system recording its surroundings with a number of recording units arranged in and/or on the vehicle 1, wherein at least one recording unit is configured as a camera whose recording area is directed in front of the vehicle 1.

By means of the recorded signals from the sensor system recording the surroundings, the area around the vehicle 1 and objects located in that area, including the heavy machine 3, are recorded.

The objects recorded in the area around the vehicle 1 are classified in a control unit of the vehicle 1, in particular an assistance system for autonomous driving mode, based on their recorded contour and/or on the recorded appearance, in particular color, morphology, etc., so that it is determined that the object recorded in front of the vehicle 1 is a heavy machine 2 with an arm 3, in particular an excavator.

Specifically, data for classifying recorded objects are stored in the control unit and compared to recorded image signals from the at least one camera in the sensor system recording the surroundings.

It is also conceivable that the existence of a heavy machine 2 in the area of this road section could be transmitted to the control unit of the vehicle 1 by means of a vehicle-to-vehicle communication and/or a vehicle-to-infrastructure communication.

In addition, based on the recorded signals from the sensor system recording the surroundings, a movement route, i.e., a "flight plan," for the load 4 on the moving arm 3 is determined based on at least one movement model. In particular, the movement route of the load 4 is predicted using the movement model.

The load 4 on the arm 3 is then classified as to the risk it presents for the occupants of the vehicle 1, i.e., a hazard potential is predicted. In the simplest case, the load 4 is classified as hazardous or not hazardous.

Advantageously, the nature of the load 4 is determined for classification. This can be done, for example, by means of image processing. If it is recognized that the load 4 is a type of load that includes load parts that could come loose due to the movement of the load 4, this load 4 is classified as hazardous. Such a load 4 would be a pallet of roof tiles stapled to each other, for example. The load 4 is also classified as hazardous if it is recognized that the load 4 is making swinging motions. Such swinging can be caused or exacerbated in particular by environmental influences such as wind, for example.

If it is determined that the load 4 on the arm 3 or the arm itself may represent a hazard for the vehicle 1, passage under the load 4 is prevented. If the load 4 is not hazardous, passage under it is allowed.

However, it is also conceivable that risk classification may be omitted. In such a case, passage under the load 4 is prevented regardless of whether a hazard actually exists.

When the load 4 is recognized on the road section F, initially a comfort braking distance of the vehicle 1 is applied in such a way that the vehicle 1 comes to a standstill at a safe distance before the load 4.

In this case, comfortable braking is initiated only if the load 4 is classified as potentially hazardous for the vehicle 1 and its occupants. In other words, passage under the load 4 is prevented by braking the vehicle 4 to a standstill, with driving mode of the vehicle 1 resumed once the load is no longer in the driving route of the vehicle 1. This means that a time to resume driving is calculated for the vehicle 1, wherein the movement route of the load 4 is predicted based on the movement model.

If the load 4 in the driving route of the vehicle 1 is not detected and classified as potentially hazardous only until a distance from the vehicle 1 to the load 4 falls below a given distance, emergency braking of the vehicle 1 is automatically initiated and brings it to a standstill.

If the load 4 moves out of the driving route of the vehicle 1, whereby the load 4 leaves an area of the road section F so that the load 4 no longer represents any particular hazard for the vehicle 1, the driving mode of the vehicle 1 is resumed. A safety distance is still also established for this purpose.

If the load 4 is static, such as a fallen tree or a crane for which no motion of its own is recorded, then a new plan for the trajectory of the vehicle 1 is generated to circumvent the load 4.

If the load 4 is moving, the trajectory of the vehicle 1 can also be re-planned if there is sufficient space available to circumvent the working area of the heavy machine 2.

It is also possible that prevention of passage under the load 4 takes place by braking the vehicle 1 to a standstill, wherein a decision regarding how to proceed with respect to further operation of the vehicle 1 is requested from a remote operator. The remote operator can evaluate the traffic situation facing the vehicle 1 and initiate further control of the driving mode for the vehicle 1.

LIST OF REFERENCE INDICATORS

1 Vehicle
2 Heavy machine
3 Arm
4 Load
F Road section

What is claimed is:

1. A method for operating the assistance system of a vehicle, wherein in an autonomous driving mode of the vehicle, passage under an obstacle having a passage height that has been determined to be sufficiently high is prevented by a control unit, wherein the control unit determines if the obstacle is a working machine carrying a movable load unit, the control unit also determines whether the movable load unit protrudes into the driving route or is moving into the driving route of the vehicle, and wherein the control unit is configured to predict a hazard potential to the vehicle resulting from the movable load unit protruding into or moving into the driving route of the vehicle and to prevent passage under the obstacle only if the predicted hazard potential is at or above a predetermined level.

2. The method of claim 1, wherein prevention of the passage under the obstacle takes place by braking the vehicle to a standstill, and a driving mode of the vehicle is resumed once the load is no longer in the driving route.

3. The method of claim 1, wherein prevention of the passage under the obstacle takes place by re-planning a trajectory for the vehicle, so that an operating area of the working machine is circumvented.

4. The method of claim 1, wherein prevention of the passage under the obstacle takes place by braking the vehicle to a standstill, and a decision regarding how to proceed with respect to further operation of the vehicle is requested from a remote operator.

5. The method of claim 1, wherein the working machine is detected based on its contour.

6. The method of claim 5, wherein the contour of the working machine is determined based on detected signals from a sensor system detecting the surroundings of the vehicle.

7. The method of claim 1, wherein a movement path of the movable load unit being carried by the working machine is determined by a movement model.

8. The method of claim 1, wherein, if a distance from the vehicle to the movable load unit falls below a given distance, emergency braking is automatically initiated.

9. A device for executing the method of claim 1, wherein, in the autonomous driving mode of the vehicle, the control unit of the assistance system prevents passage under the movable load unit having the passage height that has been determined to be sufficiently high, if it is determined that the movable load unit is the movable load unit being carried by the working machine that protrudes into the driving route or is moving into the driving route of the vehicle.

10. A method for operating the assistance system of a vehicle, wherein in an autonomous driving mode of the vehicle, passage under an obstacle is prevented by a control unit in the vehicle if the control unit determines:
   the obstacle is a working machine carrying a movable load unit having a variable height with respect to the working machine and
   the movable load unit protrudes into the driving route or is moving into the driving route of the vehicle,
   a hazard potential prediction to the vehicle resulting from the movable load unit protruding into or moving into the driving route of the vehicle,
   and wherein the control unit prevents passage under the obstacle only if the predicted hazard potential is at or above a predetermined level.

11. The method of claim 10, wherein passage under the obstacle is prevented even when the passage height has been determined to be sufficiently high if it has also been determined that the movable load unit protrudes into the driving route or is moving into the driving route.

* * * * *